United States Patent [19]

Noffsinger

[11] Patent Number: 5,205,362

[45] Date of Patent: Apr. 27, 1993

[54] CUSHIONED HORSESHOE

[76] Inventor: Alfred A. Noffsinger, 84-189 Indio Blvd., Indio, Calif. 92201

[21] Appl. No.: 819,832

[22] Filed: Jan. 13, 1992

[51] Int. Cl.$^5$ .......................... A01L 7/02; A01L 1/04
[52] U.S. Cl. ...................................................... 168/13
[58] Field of Search ........... 168/4, 12, 13, 14, DIG. 1

[56] References Cited

U.S. PATENT DOCUMENTS

| | | | |
|---|---|---|---|
| 687,435 | 11/1901 | Octigan et al. | 168/14 |
| 1,091,928 | 3/1914 | Griffin | 168/DIG. 1 X |
| 2,758,655 | 8/1956 | Crump | 168/13 |
| 3,494,422 | 2/1970 | Clark | 168/DIG. 1 X |
| 3,664,428 | 5/1972 | Spencer | 168/4 |

FOREIGN PATENT DOCUMENTS 357983 9/1931 United Kingdom ................ 168/13

*Primary Examiner*—Robert P. Swiatek
*Attorney, Agent, or Firm*—Francis X. LoJacono

[57] ABSTRACT

A shock-absorbing, cushioned horseshoe that substantially absorbs the shock encountered by a horse's hooves and legs when the horse is running or jumping. The cushioned horseshoe is defined by a mounting plate which is adapted with a plurality of interlocking channel members, wherein one of the channel members includes a plurality of longitudinal locking rib members, whereby a nail may be driven through the horseshoe to engage each locking rib member so as to prevent the nail from being inadvertently loosened after the nail has been driven into the hoof of a horse. Fixedly attached to the mounting plate is a ground-engaging sole member that includes openings which are aligned with the holes which are formed in the mounting plate. The sole member consists of a non-slip, wear resistant, resilient material that is adapted for direct engagement with the ground surface. The resilient material is molded to the lower surface of the mounting plate and is received in each of the channel members, whereby the resilient material becomes fixedly secured to the lower surface of the mounting plate during the molding process to prevent separation therefrom.

6 Claims, 1 Drawing Sheet

CUSHIONED HORSESHOE

BACKGROUND OF THE INVENTION

1. Field of the Invention

The present invention relates generally to horseshoes and more particularly to a cushioned shock-absorbing horseshoe which substantially absorbs the shock that is transferred to the horse's hoofs and legs when the horse is taking part in running or jumping or other various activities. The cushioned horseshoe includes a mounting plate to which a non-slip, resilient sole or body member is affixed to and interlocked with the mounting plate whereby the resilient sole makes direct contact with the ground surface.

2. Description of the Prior Art

As is well known in the art various problems and difficulties are encountered in providing suitable means incorporated in a horseshoe so as to prevent the transmission of shock to the horse's hoofs and legs as the horse is jumping, racing, etc.

Horses are shod not only to protect hoofs but also as a safety measure to prevent slipping. However, when a horse is shod with conventional metal horseshoes, the shock created when the horse's hoofs strike the ground is increased substantially and is transmitted to the legs. This increased shock will cause soreness in the horse's legs and will frequently cause the horse to alter his stride pattern. In many cases this change in stride pattern becomes the cause of strained ankles, knees, tendon, etc. Metal shoes also increase the chance of slipping on surfaces such as cement. However, none of the known attempts to overcome the above problems has been found to be completely satisfactory.

There have been many types of horseshoes designed, tried and suggested in order to provide a horseshoe which will cushion at the time of impact the force of horse's hoofs while running on different types of ground surfaces. However, these horseshoes have various limitations that restrict their use and they are generally unsuitable for most ground conditions. Moreover, some types are complicated in structure and expensive to manufacture and maintain. As examples of known horseshoes one may refer to any of the following patents.

In U.S. Pat. No. 508,607 issued to W. C. Edge, there is disclosed a horseshoe comprising a fastening plate that is arranged to be secured to a hoof by nails. The fastening plate is formed having depending lug members along the outer and inner edges thereof. A wearing plate or main section of hard material of the shoe has beveled kerfs or notches that are arranged to receive the lug members of the fastening plate, whereby the wearing plate is secured to the fastening plate. A packing of a flexible material is interposed between the fastening plate and the wearing plate.

U.S. Pat. No. 3,494,422 issued to Clark discloses a plastic horseshoe formed from a synthetic resin material. Although this provides some resiliency, the amount of shock absorption is minimal and the wear capability is inferior to that of metallic shoes.

U.S. Pat. No. 4,889,188 issued to Willard H. Anderson is formed from a predetermined metallic material having a central arcuate portion, an arcuate right leg portion, and an arcuate left portion. The arcuate leg portions have a predetermined thickness of non-metallic shock absorbing material attached to their bottom surface.

U.S. Pat. No. 971,138, issued to McCormick, discloses a horseshoe having a body portion adapted to be nailed to the horse's hoof. The body portion is provided with a plurality of screw-threaded holes. A metal wear plate, which is adapted to be secured to the underside of the body portion, has countersunk openings which coincide with the screw-threaded holes located in the body portion. The wear plate is secured to the body portion by screws which pass through the countersunk openings and through a layer of resilient material disposed between the body portion and the plate, and up into the threaded holes. The resilient layer provides almost no shock capabilities, however, since the screws are rigidly secured to the body portion and the heads of the screws contact the running surface. There is, therefore, very little mechanical insulation between the surface and the horse's hooves.

A cushioned horseshoe is also disclosed in U.S. Pat. No. 815,399 issued to Anderson. This shoe includes a body which is shaped to fit a hoof and a resilient pad similar in shape to the body. A wear plate has the same shape in outline as the body and the pad. The horseshoe is mounted on the horse's hoof by driving nails through openings located in the plate, and through the pad, and then through the openings provided in the body of the horseshoe.

A soft-tread horseshoe is disclosed in U.S. Pat. No. 924,790 issued to Michael Kane. This shoe is formed having a metal shoe that is completely embedded in a body of rubber. This is accomplished by molding the rubber body about the metal shoe.

The Anderson shoe exhibits minimal shock-absorbing capabilities since the nails, just like the screws in the McCormick shoe, transmit shock directly from the running surface to the horse's hooves. It is possible that the nails in the Anderson shoe will be driven up into the hoof, thereby seriously injuring the horse. Also, the constant flexing a pad C will tend to loosen the nails so that the shoe will eventually work loose to the point that it is thrown, with possible injury resulting both to the horse and persons in the area.

U.S. Pat. Nos. 779,757; 830,133; 1,042,943; 2,024,265; 2,043,359; 2,103,718 and 2,157,826 also disclose shoes which are designed to cushion a horse's hooves. These shoes, however, exhibit one or more of the limitations set forth above regarding other prior-art shoes. A shoe which provides substantial shock-absorbing capabilities yet can be securely fixed to the horse's hoof without injury would be highly desirable. Such a shoe would be preferably light in weight, durable, of simple manufacture, and easily installed using conventional tools.

SUMMARY AND OBJECTS OF THE INVENTION

The present invention defines a shock-absorbing, non-slip, cushioned horseshoe that is arranged to be mounted to the hooves of a horse, but is more particularly suited for use on racehorses and the like. The cushioned horseshoe has a generally U-shaped configuration formed having an aluminum extruded mounting plate that includes a plurality of spaced-apart interlocking channels. These interlocking channels are defined by oppositely disposed side channels and two substantially upright channels. One of the upright channels is formed having a multiplicity of nail holes therein. One of the side walls of this particular channel is provided with a plurality of longitudinal rib members that are arranged to lockingly engage with the mounting horseshoe nails. Each of the channels defines a means by which a resilient sole or body member is fixedly secured to the underside of the mounting plate. The resilient body member does not cover the contacting ribbed surface of the mounting plate. The nail openings that are formed in the resilient base member are located so as to coincide with the nail holes in the mounting plate so that the nails may be inserted into the aligned holes and driven into the horse's hoof until the head of the nail contacts the protruding and locking rib members of the upright channel. The ground-engaging surface of the base member is also provided with several protruding wear members to aid in preventing the shoe from slipping.

Accordingly, the present invention has an important object to provide a cushioned horseshoe having shock-absorbing capabilities, including a means for fixedly securing the shoe to the horse's hoof without causing injury to the horse.

It is another object of the invention to provide a cushioned horseshoe that comprises only two parts, a first part that defines a mounting plate which is adapted with a plurality of boss members, and a second part that defines a ground-engaging sole or body member consisting of a resilient material that is fixedly secured to the mounting plate by means of molding the sole member to the mounting plate in an interlocking arrangement whereby the sole member prevents the transfer of shock to the horse's hoof.

Another object of the invention is to provide a cushioned horseshoe wherein the resilient material becomes secured to the lower surface of the mounting plate during the molding process. The resilient material becomes affixed to the lower surface, but it is also fixedly molded within each of the particularly shaped and positioned channels.

Still another object of the present invention is to provide a horseshoe of this character that can also withstand large lateral forces in addition to providing a shock-absorbing shoe. This is primarily due to the fact that the channel members are arranged and formed to allow the resilient sole member to extend into the respective channels in a positive secured mode which effectively prevents the two members of the shoe from shifting laterally with respect to each other. Hence, this permits the shoe to withstand large shear forces and establishes adequate lateral support, even under racing conditions.

It is well known that under hard use, such as racing, metal shoes will heat due to the abrasion and friction with the ground. The heated shoes will tend to drive the natural lubricant out of the hoof. This negative reaction is prevented by the arrangement and construction of the present horseshoe in that the resilient sole of the shoe effectively insulates the hoof from the ground surfaces.

A further object of the present invention is to provide a device of this character that is relatively inexpensive to manufacture, and is simple yet rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, materials, arrangements or modes of operation that are properly within the scope of the appended claims.

BRIEF DESCRIPTION OF THE DRAWINGS

With the above and related objects in view, the invention consists in the details of construction and combination of parts, as will be more fully understood from the following description, when read in conjunction with the accompanying drawings and numbered parts, in which.

DESCRIPTION OF THE PREFERRED EMBODIMENT

Figure 1:
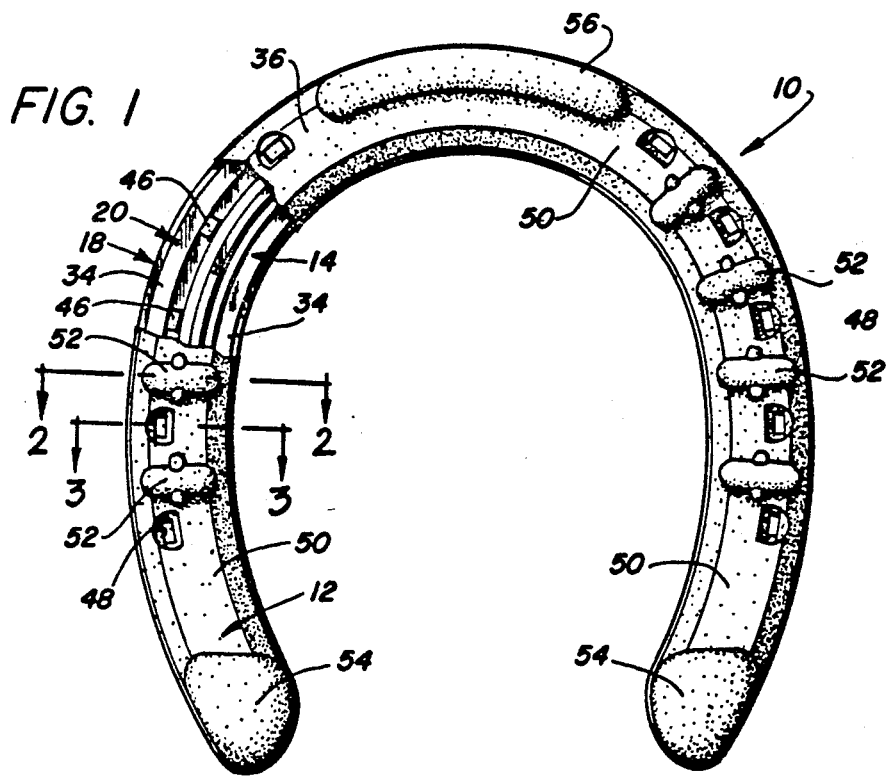
FIG. 1 is a bottom plan view of a cushioned horseshoe defining the present invention, wherein a portion thereof is broken away to show the channel member and the holes therein which help to secure the sole to the mounting plate.

Referring more particularly to the drawings, there is shown in FIG. 1 a non-slip, shock-absorbing, cushioned horseshoe, generally indicated at 10. FIG. 1 is a bottom plan view, wherein a resilient sole or body member 12 is substantially illustrated as having a U-shaped configuration. A portion of sole member 12 is broken away so as to show an interlocking mounting plate member 14, which is more readily illustrated in the perspective view of FIG. 4. and is generally referred to as the interlocking mounting plate, since it functions both as an interlocking support structure for the cushioned sole member and as a plate for mounting the shoe to the horse's hoof.

Figures 2, 3:
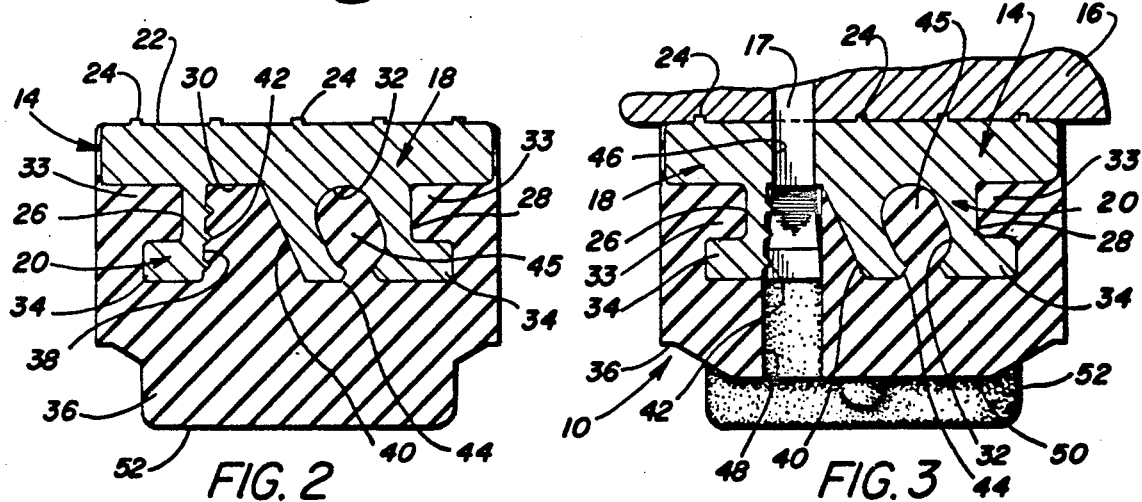
FIG. 2 is an enlarged cross-sectional view thereof taken substantially along line 2—2 of FIG. 1.
FIG. 3 is an enlarged cross-sectional view taken substantially along line 3—3 of FIG. 1 which shows a nail locked in one of the upright channel members of the mounting plate and mounted to a horse's hoof.
Figure 4:
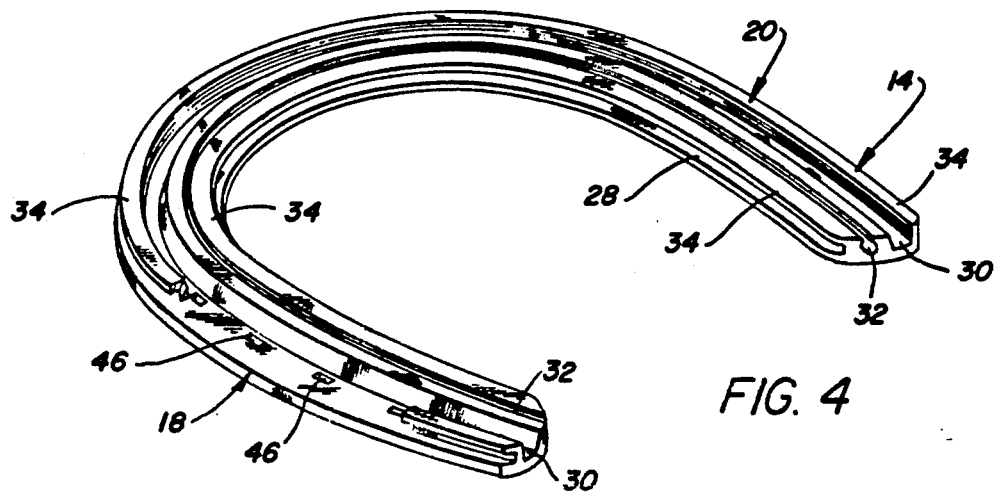
FIG. 4 is a perspective view of the mounting plate of the horseshoe illustrating the channeled surface that interlocks with the sole member.

Accordingly, mounting plate 14 is formed from an extruded aluminum or suitable light-weight metal which is then formed in a U-shaped configuration that is adaptable for securing to the bottom of the horse's hoof 16. Plate 14 defines a mounting member so as to provide the necessary means by which the resilient sole member 12 is firmly mounted and secured in place on hoof 16 by nails 17. Thus, to simplify the following description, plate 14 will be referred to as mounting plate 14. As illustrated in FIG. 4, mounting plate 14 is formed having a mounting base member 18 and a downwardly extending boss member 20 that defines a mounting surface. Mounting base member 18 is provided with a width greater than the width of boss member 20 and has a hoof engaging surface 22 that includes a plurality of longitudinal rib members 24 which engage the bottom surface of hoof 16, as illustrated in FIG. 3. Boss member 20 is formed having a plurality of spaced-apart channel members that help define a fastening means for cushioned horseshoe 10. More particularly, the channel members include a pair of side channels, indicated by numerals 26 and 28, which are located along the respective opposite outer edges 27 and 29 of mounting plate 14 and a pair of side-by-side upright channels 30 and 32 formed in boss member 20. Side channels 26 and 28 are arranged to define horizontal channels by means of mounting base member 18 and radial lip members 34 between which horizontal bead members 33 are formed, whereas upright channels 30 and 32 are arranged to define vertically arranged channel members. Each of these channel members is provided with a particular cross-sectional configuration so as to establish a positive interlocking system between the channels and the resilient material 35 that defines sole member 36 of horseshoe 10.

Channel 30 is formed having a vertical wall 38 and an oppositely disposed outwardly inclined wall 40. Vertical wall 38 includes a plurality of longitudinal securing rib members 42 which provide two functions. That is, securing rib members 42 provide an interlocking action with protruding bead member 43 of sole member 36, as seen in FIGS. 2 and 3. Rib members 42 further define a locking means for nail 17 when the nail is driven through the horseshoe into the horse's hoof, as illustrated in FIG. 2. Channel 32 is formed having an oval configuration which includes an opening 44 to receive resilient sole material 35. Opening 44 has a width smaller than the width of channel 32. A molded bead 45 is formed in the oval channel 32 by resilient material 35 so as to be captured and locked therein.

Accordingly, when resilient material 35 is molded to mounting plate 14, material 35 fills each of the channel members 26, 28, 30 and 32 to provide a positive securing means between mounting plate 14 and sole member 36. The particular arrangement and position of each corresponding channel provides an interlocking means that prevents separation between sole 36 and mounting plate 14, particularly when horseshoe 10 is subjected to various stresses that are placed on the sole member during strenuous activities of the horse.

Both mounting plate 18 and sole member 36 are provided with mounting means which are defined by aligned holes 46 formed in mounting plate 18 and holes 48 formed in the body of sole member 36. In FIG. 3 holes 46 and 48 are shown aligned so as to receive nail 17 and to readily drive it into hoof 16.

In FIG. 1, the ground-engaging wear surface 50 of sole member 36 is illustrated as having a plurality of protruding wear pads 52. The distal ends of the U-shaped sole are formed having enlarged toe-like wear pads 54, with transverse elongated wear pads 52 interposed between nail holes 48. Still another wear pad 56 is positioned at the leading arch of sole member 36. Thus, wear pads 52, 54 and 56 define a means for preventing shoe 10 from slipping under various adverse ground conditions while the horse is running or jumping.

The preferred method of securing or mounting sole member 36 to plate 14 is by molding a resilient material, such as neoprene or the like, to mounting plate 14 and allowing the material to fill in the entire length of each of the channels 26, 28, 30 and 32. Therefore, this arrangement defines the securing means that prevents sole member 36 from pulling apart from mounting plate 14.

It should be noted that an adhesive is often coated on the undersurface of the metal plate to establish a stronger bond between plate 14 and sole 36 of cushioned horseshoe 10. With such a strong bonding between metal plate 14 and sole member 36, the resilient sole is free to expand laterally in all directions including the area under each channel, thereby enhancing the cushioning effect of sole member 36. Thus, shoe 10 is also capable of withstanding large lateral forces in addition to providing a substantial cushioning effect. This effect is primarily due to the location of the depending channels and the captured beads within the channels. This arrangement effectively prevents the separation of the resilient material from the mounting surface of plate 14 by preventing lateral shifting of sole 36. Accordingly, this feature permits shoe 10 to withstand large shear forces and provides adequate lateral support for each of the horse's legs, even under unsuitable ground conditions.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What I claim is:

1. A cushioned horseshoe comprising:
   a mounting plate having an upper hoof-engaging surface and a lower mounting surface;
   a depending boss member formed in said mounting plate that defines said lower mounting surface;
   a sole member formed from a resilient material and secured to said lower mounting surface of said mounting plate;
   means for securing said sole member to said mounting plate, said securing means comprising a plurality of interlocking channels, wherein said resilient material of said sole member is molded into each of said interlocking channels;
   locking means formed in one of said interlocking channels, whereby a nail may be driven through said mounting plate to engage said locking means to prevent the nail from being inadvertently loosened after the nail has been driven through said horseshoe and into the hoof of a horse, wherein said interlocking channels comprise:
   a pair of horizontal channel members formed adjacent the outer edges of said mounting plate; and
   a pair of vertical channel members, whereby said resilient material is affixed to said lower mounting surface and disposed within each of said vertical and horizontal channel members.

2. A cushioned horseshoe as recited in claim 1, wherein said locking means comprises a plurality of longitudinal rib members formed in one of said vertical channel members.

3. A cushioned horseshoe as recited in claim 2, wherein said longitudinal rib members are further defined as part of said securing means for said sole member.

4. A cushioned horseshoe as recited in claim 3, wherein said vertical channel members define a first vertical channel member and a second vertical channel member, said first vertical channel member being formed having a vertical wall and an outwardly inclined wall, and a plurality of spaced-apart nail holes formed in said first channel member adjacent said longitudinal rib members, whereby nails are driven through said nail holes for locking engagement with said longitudinal rib members.

5. A cushioned horseshoe as recited in claim 4, wherein said second vertical channel member is formed having an oval configuration.

6. A cushioned horseshoe as recited in claim 5, wherein said sole member includes:
   a plurality of spaced-apart holes that are positioned to be aligned with said nail holes of said mounting plate; and
   a plurality of wear members.

* * * * *